(12) United States Patent
Nomura

(10) Patent No.: US 8,212,890 B2
(45) Date of Patent: Jul. 3, 2012

(54) IMAGING DEVICE AND IMAGING METHOD

(75) Inventor: Kenichiroh Nomura, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 247 days.

(21) Appl. No.: 12/713,373

(22) Filed: Feb. 26, 2010

(65) Prior Publication Data

US 2010/0231746 A1    Sep. 16, 2010

(30) Foreign Application Priority Data

Mar. 12, 2009    (JP) .................................. 2009-059883

(51) Int. Cl.
*H04N 9/73* (2006.01)
*H04N 5/228* (2006.01)
*G06K 9/00* (2006.01)

(52) U.S. Cl. ............... 348/225.1; 348/222.1; 348/223.1; 382/162; 382/164; 382/167

(58) Field of Classification Search ............... 348/222.1, 348/223.1, 225.1; 382/162, 164, 167
See application file for complete search history.

(56) References Cited

U.S. PATENT DOCUMENTS

| 5,555,022 A * | 9/1996 | Haruki et al. ............ 348/223.1 |
| 2004/0095478 A1* | 5/2004 | Takano et al. ............ 348/223.1 |

FOREIGN PATENT DOCUMENTS

| JP | 2000-354253 A | 12/2000 |
| JP | 2002-271638 A | 9/2002 |
| JP | 2005-347811 A | 12/2005 |
| JP | 2007-129622 A | 5/2007 |

* cited by examiner

*Primary Examiner* — Sinh Tran
*Assistant Examiner* — Mark Monk
(74) *Attorney, Agent, or Firm* — Dickstein Shapiro LLP

(57) ABSTRACT

An imaging device is configured to include a dividing unit which divides a generated image into blocks, a white balance evaluation value acquiring unit which acquires color information and a white balance evaluation value of each block, a classifying unit which combines the blocks into areas based on the color information, a correction coefficient calculating unit which calculates a white balance correction coefficient for each of the areas, a white balance setting unit which sets the calculated white balance correction coefficient for each of the areas, and a green area determining unit which determines whether or not each of the blocks is a green area based on the color information. The white balance setting unit sets a different white balance correction coefficient for a block determined as a green area from the one set for the area including the block in question.

12 Claims, 12 Drawing Sheets

FIG. 13
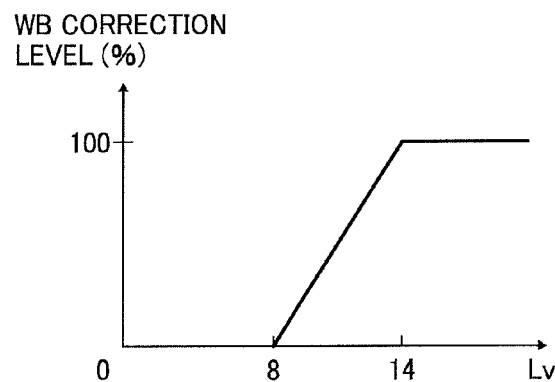
FIG. 14
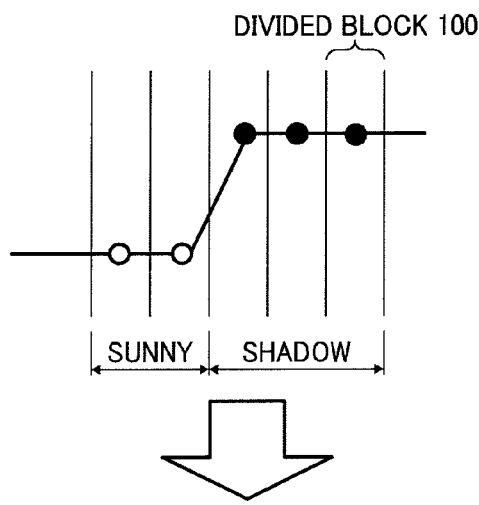
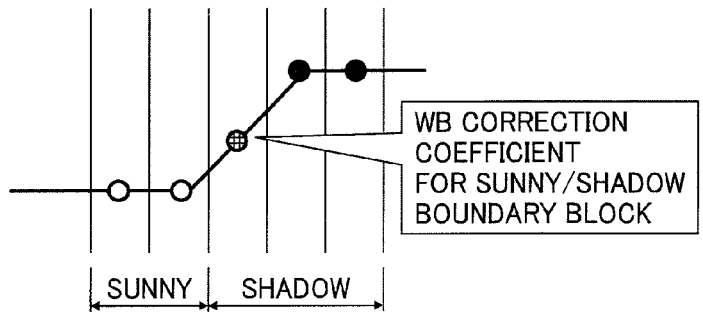

IMAGING DEVICE AND IMAGING METHOD

CROSS REFERENCE TO RELATED APPLICATIONS

The present application is based on and claims priority from Japanese Patent Application No. 2009-59883 filed on Mar. 12, 2009, the disclosure of which is hereby incorporated by reference in its entirety.

BACKGROUND OF THE INVENTION

1. Field of the Invention

The present invention relates to an imaging device, an imaging method and a computer readable storage medium, particularly to an imaging device and an imaging method with a white balance control function which realizes a good white balance correction.

2. Description of the Related Art

There has been a widely used technique in the field of an imaging device to determine a light source of uniform light in an entire captured image and perform the same level of a white balance correction on the entire image. However, a problem may arise in this technique when a captured image is illuminated with different kinds of light sources that the same level white balance correction is not suitable for such an image.

In view of solving such a problem, Japanese Laid-open Patent Publication No. 2002-271638 discloses a white balance control to prevent color shifts in the entire image by dividing a captured image into small areas and performing white balance correction on each of the small areas, for example. Also, Japanese Laid-open Patent Publication No. 2005-347811 discloses a more advanced white balance control to perform white balance correction on each pixel in order to resolve color shifts in a boundary of the small areas, for example. Moreover, Japanese Laid-open Patent Publication No. 2007-129622 discloses a white balance control function to divide a color image into small areas in association with types of light sources based on brightness of illumination and calculate a correction coefficient for each of the divided areas.

However, the techniques disclosed in the three documents have a problem that when a subject is illuminated with a plurality of light sources, different levels of white balance are done on the single subject, which causes generation of an unnatural image. Another problem is that, depending on a captured scene, the area division of an image based only on brightness components is not good enough for proper white balance correction in association with types of light source. This is because a yellow color shows a relatively high brightness while a blue color shows a low brightness and a blue color in a sunny area may show lower brightness than a yellow color in a shadow area.

SUMMARY OF THE INVENTION

The present invention aims to provide an imaging device and an imaging method which can stably divide an image into small areas to perform proper white balance correction on the image, as well as to provide a computer readable storage medium in which a program to allow a computer to execute such proper white balance correction is stored.

According to one aspect of the present invention, an imaging device comprises an optical system which captures an optical image of a subject; an image sensor which converts the optical image into an electric signal and outputs the electric signal as an image signal; an image generator which generates an image of the subject based on the imaging signal; a dividing unit which divides the generated image into n blocks, the n being an integer of 4 or more; a white balance evaluation value acquiring unit which acquires color information from the image signal and acquires a white balance evaluation value of each of the n blocks from the color information for a white balance control; and a classifying unit which combines the n blocks into m areas based on the color information, the m being an integer satisfying a relation $n > m \geq 2$; a correction coefficient calculating unit which calculates a white balance correction coefficient for each of the m areas based on white balance evaluation values of the blocks in each of the m areas; a white balance setting unit which sets the calculated white balance correction coefficient for each of the m areas; and a green area determining unit which determines whether or not each of the n blocks is a green area based on the color information, wherein when there is a block among the n blocks determined as a green area by the green area determining unit, the white balance setting unit sets a different white balance correction coefficient for the block from one set for an area including the block.

According to another aspect of the present invention, an imaging method comprising the steps of capturing an optical image of a subject; converting the optical image into an electric signal and outputting the electric signal as an image signal; generating an image of the subject based on the image signal; dividing the generated image into n blocks, the n being an integer of 4 or more; acquiring color information from the image signal and acquiring a white balance evaluation value of each of the n blocks from the color information for a white balance control; and combining the n blocks into m areas based on the color information, the m being an integer satisfying a relation $n > m \geq 2$; calculating a white balance correction coefficient for each of the in areas based on white balance evaluation values of the blocks in each of the m areas; setting the calculated white balance correction coefficient for each of the m areas; and determining whether or not each of the n blocks is a green area based on the color information, wherein in the coefficient setting step, when there is a block among the n blocks determined as a green area in the green area determining step, a different white balance correction coefficient is set for the block from one set for an area including the block.

According to still another aspect, a computer readable storage medium in which a program is stored. The program allows a computer to execute the steps of capturing an optical image of a subject and converting the optical image into an electric signal and outputting the electric signal as an image signal; generating an image of the subject based on the image signal; dividing the generated image into n blocks, the n being an integer of 4 or more; acquiring color information from the image signal and acquiring a white balance evaluation value of each of the n blocks from the color information for a white balance control; and combining the n blocks into m areas based on the color information, the m being an integer satisfying a relation $n > m \geq 2$; calculating a white balance correction coefficient for each of the in areas based on white balance evaluation values of the blocks in each of the in areas; setting the calculated white balance correction coefficient for each of the in areas; and determining whether or not each of the n blocks is a green area based on the color information, wherein the coefficient setting step includes setting, when there is a block among the n blocks determined as a green area in the green area determining step, a different white balance correction coefficient for the block from one set for an area including the block.

BRIEF DESCRIPTION OF THE DRAWINGS

Features, embodiments, and advantages of the present invention will become apparent from a detailed description with reference to the following drawings.

FIG. 13 is a graph showing a relation between subject brightness Lv and a level of white balance in the shadow area;

FIG. 14 shows how to calculate white balance correction coefficients in sunny/shadow boundary blocks;

DETAILED DESCRIPTION OF THE PREFERRED EMBODIMENT

Hereinafter, one embodiment of the imaging device according to the present invention will be described in detail with reference to the accompanying drawings.

Figure 1:
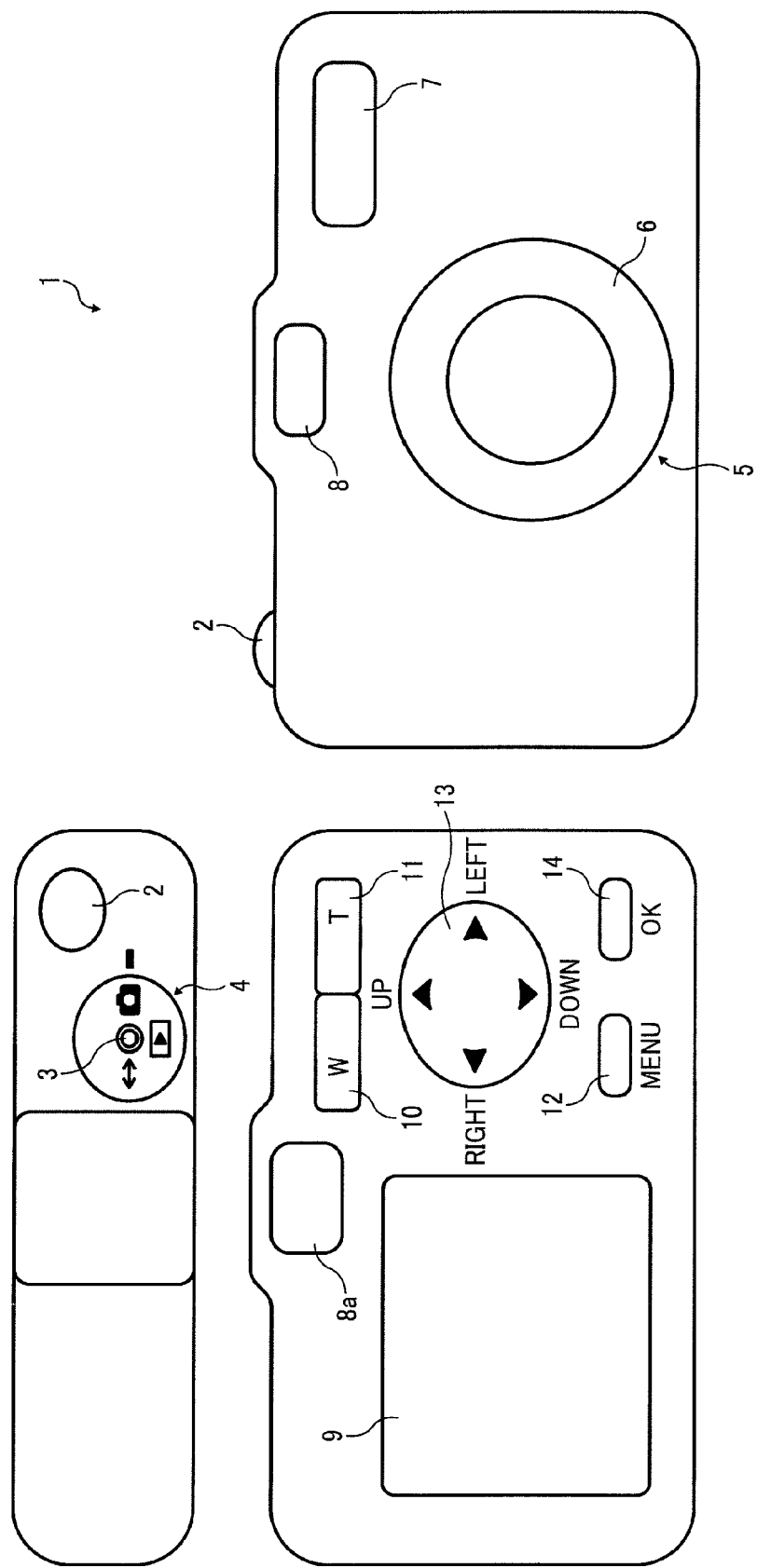
FIG. 1 shows a digital camera as an example of an imaging device according to an embodiment of the present invention.

FIG. 1 schematically shows the exterior of a digital camera as an imaging device of a first embodiment of the present invention. In FIG. 1 a digital camera 1 comprises a shutter button 2, a power-on button 3, and a shooting/reproduction switch dial 4 on a top face as well as a lens barrel 6 having a lens system 5, a strobe light emitting portion 7, and a viewfinder 8 on a front face.

The digital camera 1 comprises an LCD monitor 9, an eyepiece 8a of the viewfinder 8, a wide-angle zoom switch 10, a telephoto zoom switch 11, a menu button 12, a scene switch button 13, an OK button 14 and the like on a back face. It further comprises, on a side face, a memory card container into which a memory card 15 storing captured image data is inserted.

Figure 2:
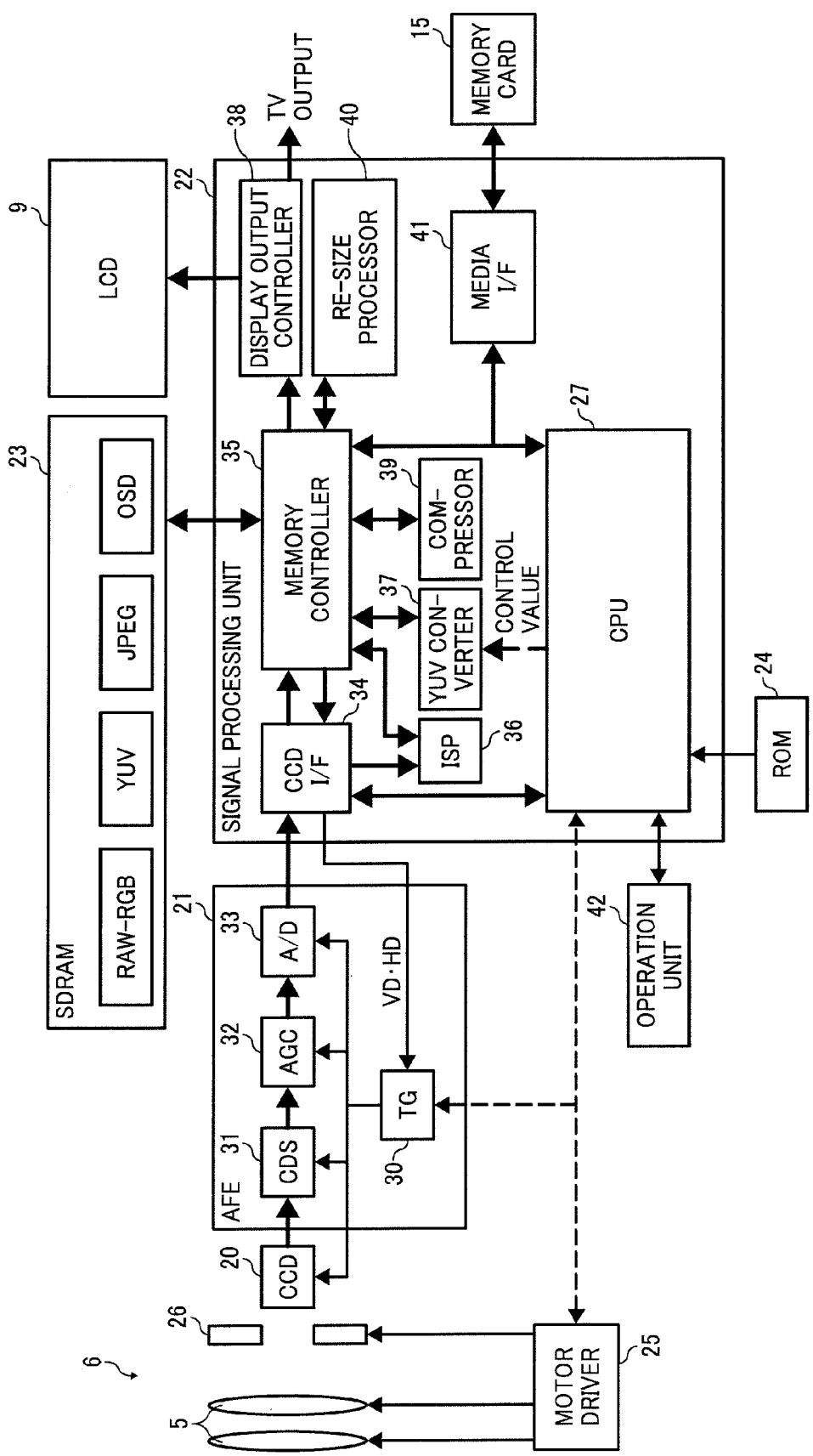
FIG. 2 is a block diagram showing the structure of the digital camera as the imaging device according to, the embodiment of the present invention.

FIG. 2 shows a structure of the digital camera 1. The digital camera 1 therein contains a CCD 20 as a solid image sensor which forms, on its receiving face, a subject image having passed through the lens system 5 of the lens barrel 6, an analog front end 21 (AFE) which converts an electric signal (analog RGB image signal) from the AFE 21 into a digital signal, a signal processing unit 22 which processes the digital signal from the AFE 21, an SDRAM 23 temporarily storing image data, an ROM 24 storing a control program and else, and a motor driver 25 and the like.

The lens barrel 6 comprises the lens system 5 having a zoom lens, a focus lens and other lenses, and a not-shown aperture diaphragm unit, and a mechanical shutter unit 26 which are driven by respective drivers. A motor driver 25 drives the drivers and is controlled by a drive signal from a controller (CPU) 27 of the signal processing unit 22.

The CCD 20 has a plurality of pixels with RGB filters arranged thereon and outputs analog RGB image signals associated with three RGB colors.

The AFE 21 comprises a timing signal generator (TG) 30 driving the CCD 20, a correlated double sampling unit (CDS) 31 sampling the analog RGB signal from the CCD 20, an analog gain controller (AGC) 32 adjusting a gain of the sampled image signal with the CDS 31, and an A/D converter 33 converting the gain-adjusted image signal with the AGC 32 into a digital signal (RAW-RGB data).

The signal processing unit 22 comprises a CCD interface (I/F) 34 which captures RAW-RGB data in accordance with a horizontal synchronizing (HD) signal and a vertical synchronizing (VD) signal from the TG 30 of the AFE 21, a memory controller 35 controlling the SDRAM 23, a YUV converter 37 converting the RAW-RGB data into displayable, recordable YUV image data, a re-size processor 40 which changes an image size in accordance with an image file size for display and recording, a display output controller 38 controlling display output of image data, a data compressor 39 compressing image data in JPEG format for recording, a media interface (I/F) 41 writing/reading image data to/from the memory card 14, and a CPU 27 controlling the entire system of the digital camera 1 according to a control program stored in the ROM 24, upon receiving operation input information from an operation unit 42.

The operation unit 41 is constituted of the shutter button 2, power-on button 3, shooting reproduction switch dial 4, wide-angle zoom switch 10, telephoto zoom switch 11, menu button 12, OK button 15 and else. In accordance with a user's operation, a predetermined operation instructing signal is output to the CPU 27.

The SDRAM 23 stores image data such as the RAW-RGB data input to the CCD I/F 34, YUV data (image data in YUV format) converted with the YUV converter 37, JPEG data compressed with the data compressor 39, and on-screen display (OSD) data. The OSD data is operational setup information displayed on the YUV data or JPEG image on the LCD monitor 9.

Note that YUV format is to represent color with brightness data (Y) and color difference data (a difference (U) between brightness data and blue (B) component data and a difference (V) between brightness data and red (R) component data). For image conversion, the controller sets white balance gains Rg, Bg to an image signal controller (ISP) 36 which is a main portion of the signal processing unit 22 and performs white balance correction, gamma correction, color correction and so on.

Next, live view operation and still image shooting operation of the digital camera 1 will be described. The digital camera 1 shoots a still image while performing live view operation in still image shooting mode.

First, a photographer turns on the power-on button 3 and sets the still image shooting mode at the shooting/reproduction switch dial 4, which activates the digital camera 1 in recording mode. Upon detecting the turning-on of the power-on button 3 and the setting of the shooting/reproduction switch dial 4, the controller (CPU 27) outputs a control signal to the motor driver 25 to move the lens barrel 6 to a photographable position and activate the CCD 20, AFE 21, signal processing unit 22, SDRAM 23, ROM 24, LCD monitor 9, and the like.

Then, when the photographer directs the lens system 5 of the lens barrel 6 to a subject, a subject image is formed on the light receiving faces of pixels of the CCD 20 through the lens system 5. The CCD 20 outputs electric signals (analog RGB image signals) corresponding to the subject image and the electric signals are input to the A/D converter 33 via the CDS 31 and AGC 32 and converted into RAW-RGB data in 12 bits.

The RAW-RGB data is input to the CCD I/F 34 of the signal processing unit 22, and stored in the SDRAM 23 via the memory controller 35. Read from the SDRAM 23, the RAW-RGB data is input to the YUV converter 37, converted into displayable YUV data (YUV signal) and stored in the SDRAM 23 via the memory controller 35.

YUV data is read from the SDRAM 23 via the memory controller 35 and transmitted to the LCD monitor 9 via the display output controller 38 for display of a captured image (video). In the live view mode in which a captured image is displayed on the LCD monitor 9, the CCD I/F 34 thins out the pixels to read one frame of image per 1/30 second.

In the live view mode, although a captured image is displayed on the LCD monitor 9 as an electronic viewfinder, the shutter button 2 is not pressed (halfway pressed) yet.

The photographer can check composition of a still image while viewing the captured image on the LCD monitor 9. Also, the display output controller 38 is configured to output TV video signals to display the captured image (video) on an exterior TV screen via a video cable.

The CCD I/F 34 of the signal processing unit 22 calculates an autofocus (AF) evaluation value, an auto exposure (AE) evaluation value, an auto white balance (AWB) evaluation value from the input RAW-RGB data. In the present embodiment, brightness information refers to the AE evaluation value, the white balance evaluation refers to the AWB evaluation value, and a white balance evaluation acquiring unit is a part of the CCD I/F 34 of the signal processing unit 22.

The AF evaluation value is calculated from an output integration value of a high frequency component filter or an integration value of a difference in brightness among neighboring pixels, for example. The high frequency components are largest in amount in in-focus state since the edge portion of a subject is distinctive. By making use of this, the AF evaluation value is obtained at each focus lens position of the lens system 5 in AF operation (autofocus detection) to determine a position with a maximal AF evaluation value to be an in-focus position.

The AE and AWB evaluation values are calculated from the integration values of RGB values of RAW-RGB data. For example, a captured image corresponding to all the pixels of the CCD 20 is equally divided into 256 blocks (horizontal 16×vertical 16) by a detector circuit (dividing unit) as a part of the CCD I/F 34, and a RGB integration value is calculated in each block by the CCD I/F 34.

The controller 27 reads the calculated RGB integration value to calculate a white balance gain for realizing an appropriate white balance (WB) so that a white portion of an image is represented in white. In AE operation, brightness of each block is calculated to determine a proper exposure amount from brightness distribution. Based on the determined exposure, exposure condition (the number of electronic shutters of CCD 20, F-number of aperture diaphragm unit, opening/closing of neutral density filter or the like) is set. Moreover, in AWB operation, a control value for auto white balance correction is determined in line with color temperature of a light source of a subject from RGB distribution. Based on the determined control value, white balance correction is made on image data when the image data is converted into YUV data with the YUV converter 37. The AE operation and AWB operation are performed in real time during the live view mode.

Then, the digital camera 1 starts still image shooting when the shutter button 2 is fully pressed in live view mode, and performs AF operation and still image recording.

Upon the shutter button 2 being fully pressed, the controller 27 instructs the motor driver 25 to move the focus lens of the lens system 5 to execute AF operation of a contrast evaluation type (so-called hill climb autofocus).

The hill climb autofocus is to move the focus lens of the lens system 5 at each focus position from near/infinite to infinite/near in the case of autofocus area being the entire area of infinite to near, read, with the controller 27, the AF evaluation value of each focus position calculated by the CCD I/F 34, and bring an image into focus by moving the focus lens to an in-focus position with the maximum AF evaluation value.

Through the AE operation, the controller 27 instructs the motor driver 25 to close the mechanical shutter unit 26 at completion of exposure and allows the CCD 20 to output an analog RGB image signal for still image. As in the live view mode, the A/D converter 33 converts the signal into RAW-RGB data.

The RAW-RGB data (image signal) is input to the CCD I/F 34 of the signal processing unit 22, converted into YUV data with the YUV converter 37, and stored in the SDRAM 23 via the memory controller 35. Read from the SDRAM 23, the YUV data is converted by the re-size processor 40 into one in image file size associated with the number of recorded pixels and compressed in JPEG format by the data compressor 39. The JPEG compressed image data is written to the SDRAM 23, read therefrom via the memory controller and stored in the memory card 14 via the media I/F 41. This completes a series of imaging operation (live view operation and still image shooting).

Figure 3:
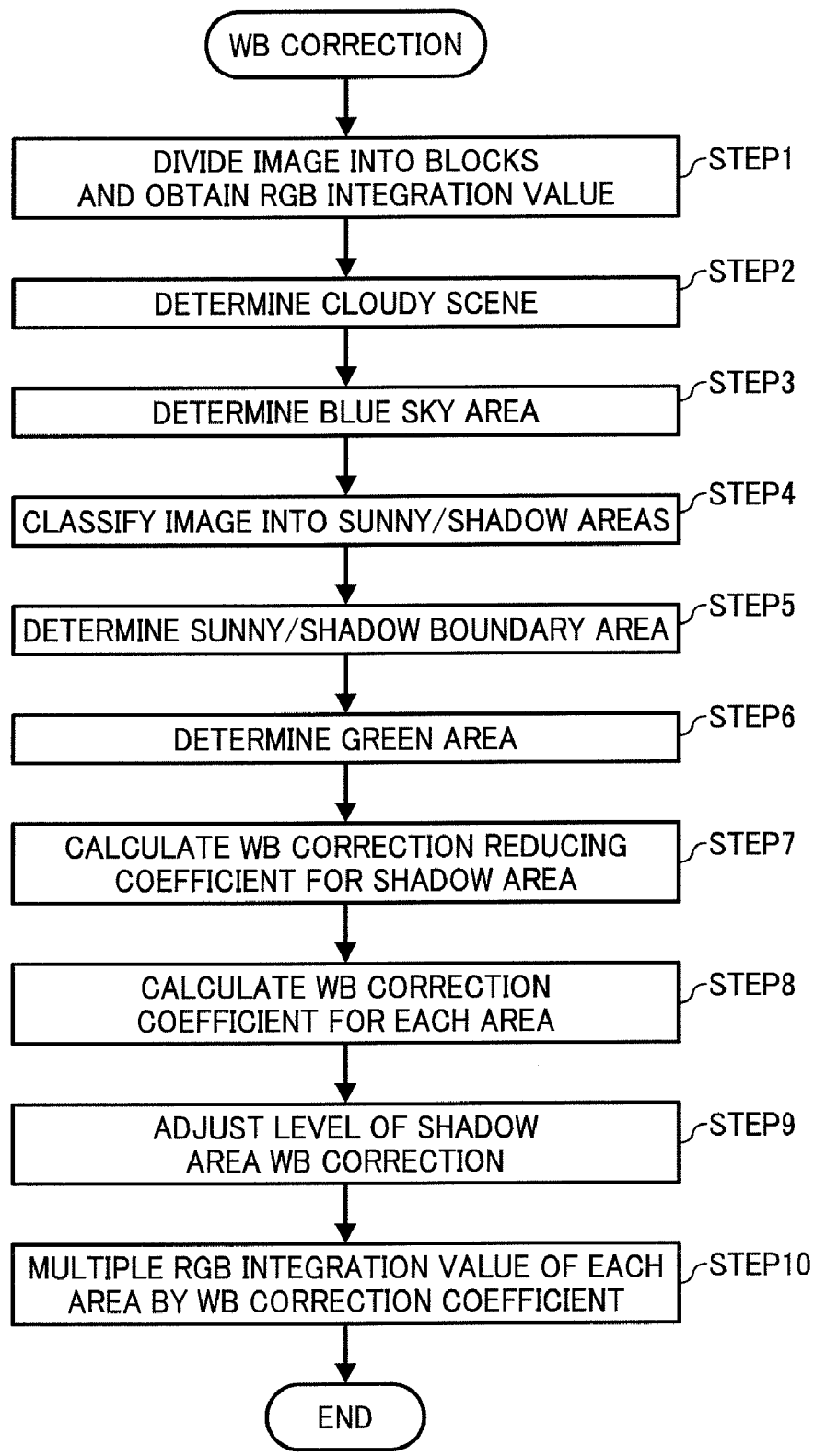
FIG. 3 is a flowchart for white balance correction of the imaging device according to the embodiment of the present invention.

Next, the features of the present invention will be described with reference to FIG. 3. FIG. 3 is a flowchart for white balance correction (hereinafter, WE correction) of the imaging device according to the present embodiment. After the series of signal processing such as WB correction, gamma correction, and color correction in still image shooting, YUV data from the image signal processor (ISP) 36 and RAW-RGB data from the CCD I/F 34 are stored in the SDRAM 23. The stored YUV data is used for WB correction on each block and different from the one stored in the memory card 14 at last.

In step S1, RAW-RGB data (image data corresponding to a captured image) is equally divided into horizontal 16×vertical 16, 256 blocks 100 to acquire an RGB integration value (WB evaluation value) by integrating RGB values of each divided block 100. Note that the number of divided blocks 100 is not limited to 16×16, 256 in the present invention, and it can be an arbitrary number n where the n is 4 or more. Also, equal division of the RAW-RGB data is not always necessary; however, all the divided blocks should be preferably the same in size and shape.

The RGB integration value will be described in detail. The RGB integration value is calculated in each divided block 100. In the present embodiment, a captured image consists of about 10 million pixels, and each divided block 100 as 1/256 of the captured image consists of about 39,000 pixels, for example. Each pixel in each divided block 100 represents R, G, or B component data of a corresponding portion of a subject and each component is 8 bit data (0 to 255). That is, there are R, G, or B component data of 8 bits for the number of pixels (about 39,000) of each of the 256 divided blocks 100.

The RGB integration value is calculated by weighted-averaging respective R components, G components, B components of all the pixels in each block. According to the present embodiment 8-bit R, G, or B component data is output from each of the 256 divided blocks 100. Further, the ratio of RGB components is R:G:B:=1:2:1 and each divided block 100 consists of about 9,750 R pixels, about 19,500 G pixels, and about 9,750 B pixels.

In step S2, a cloudy scene determination is performed based on a RGB integration value of the entire image obtained by adding RGB values of all the blocks 100, a shutter speed (Tv), an aperture value (Av), and sensitivity (Sv). In detail, brightness (Lv) of a subject is calculated from a shutter speed (Tv), an aperture value (Av), and sensitivity (Sv) by the following expression (1):

$$Lv=Tv+Av-Sv$$

Then, a captured image is determined as a cloudy scene when Lv is 8 or more and 14 or less as well as G/B≦1.4 and G/R≦1.4. The cloudy scene is determined from the entire captured image.

Next, in step S3 blue sky area determination is performed for each divided block 100 based on the obtained RGB integration value thereof to determine whether or not it has a high blue component. Specifically, the block is determined to be a blue sky area when G/R≧2 and G/B≦1.5, for example.

In step S4, all the divided blocks 100 are classified into a sunny area and a shadow area based on the RGB integration values and brightness values (Y) obtained from the RGB integration values. According to the present embodiment, the entire captured image is classified into the two areas, sunny area and shadow area. However, the present invention is not limited thereto as long as a captured image is divided into n blocks and classified into m areas where n>m≧2.

Note that in the present embodiment the brightness value (brightness signal) is calculated by the following expression (2), and a color difference signal U (Cb) and a color difference signal V (CR) are calculated by the following expressions (3) and (4), respectively.

$$Y=0.299 \times R+0.0587 \times G+0.144 \times B \quad (2)$$

$$U=-0.169 \times R-0.3316 \times G+0.500 \times B \quad (3)$$

$$V=0.500 \times R-0.4186 \times G-0.0813 \times B \quad (4)$$

How to classify the image into the sunny and shadow areas will be described by way of example. Needless to say, the present invention should not be limited to the following example. All of the divided blocks 100 are classified into the sunny area and shadow area under a condition based on the brightness values Y and a ratio R/B of a red component value R and a blue component value B which are calculated from the RGB integration value.

Figure 4:
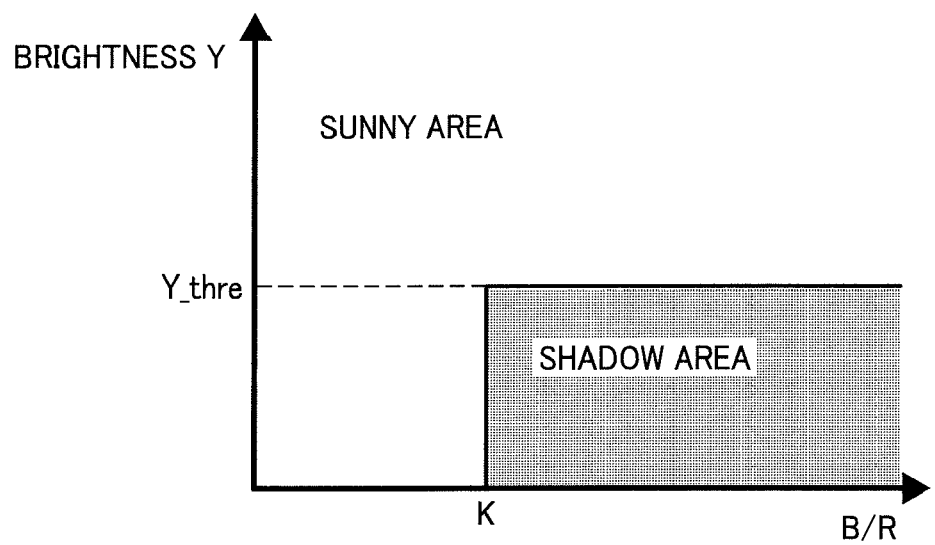
FIG. 4 shows a correlation between a brightness value Y and a ratio B/R of blue component and red component.

FIG. 4 shows an example where the divided blocks are classified into the sunny area and shadow area by the following expressions (5) and (6):

$$B/R>K \quad (5)$$

$$Y<Y_{thre} \quad (6)$$

In FIG. 4 vertical axis represents the brightness value Y and abscissa axis represents the ratio B/R.

Thus, in the present embodiment blocks not satisfying the expressions (5), (6) are determined to be sunny areas while those satisfying them are determined to be shadow areas. The imaging device stores the expressions (5), (6) as a classification condition. Each divided block 100 is determined as either a sunny area or a shadow area from the brightness value Y and the ratio R/B.

In the present embodiment K=2 in the expression (5) (the integration value of B pixels is larger than twice that of R pixels) and $Y_{thre}$=100 (in 8 bit data (0 to 255)) in the expression (6).

Further, the block determined as a shadow area in step S4 and a blue sky area in step S3 is changed to a sunny area. This can avoid the blue sky area from being subjected to the white balance correction for the shadow area, realizing accurate white balance correction.

Then, for each divided block 100, continuity of the RGB integration values of its neighboring blocks is determined. When there are minute shadow areas in a large sunny area, the minute shadow areas are changed to the sunny area, and vice versa, for example. In this manner, the same level of WB correction is performed on the large sunny area including the minute shadow areas. That is, in shooting a scene including mixed minute sunny areas and shadow areas, a good image with natural white balance can be obtained.

Figure 5:
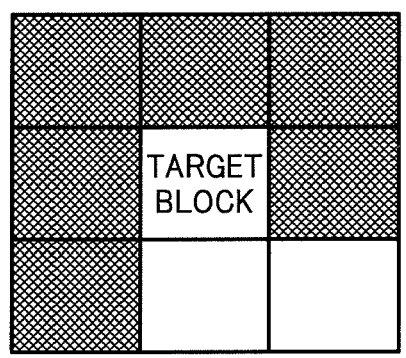
FIG. 5 shows one example of minute areas in a large area.

FIG. 5 shows an example of the continuity determination of the RGB integration values. In FIG. 1 a target block is surrounded by 8 blocks and determined to have a different result from that of 6 of the 8 blocks (shaded areas) in the sunny/shadow area determination. In this case, continuity of the RGB integration values is determined by comparing the RGB integration values of the target block with those of the 6 surrounding blocks. When the RGB integration values of the 6 blocks fall within a range of values 5% different from those of the target block, it is determined that there is a continuity in the RGB integration values, and the determination result of the target value is changed to that of the 6 surrounding blocks. One example of the RGB integration values of the target block and the 6 surrounding blocks is shown in the following table.

|  | Target Block | 6 Surrounding Blocks (within 5% difference) |
|---|---|---|
| R integration value | 128 | 121 to 135 |
| G integration value | 90 | 85 to 95 |
| B integration value | 60 | 57 to 63 |

Furthermore, the divided blocks 100 of the captured image can be determined based on in-focus information after the sunny/shadow area determination, and minute different areas can be included in a larger area as in the above.

Herein, in-focus information refers to the AF evaluation value. The AF evaluation value is calculated for each of the 16×16 divided blocks to find a focus position having the maximum AF evaluation value in each block. Having the focus position with the maximum AF evaluation value coinciding with the in-focus position during the autofocus operation, the divided block is determined as an in-focus block, and not having such a focus position, the divided block is determined as a non-focus block.

Figure 6:
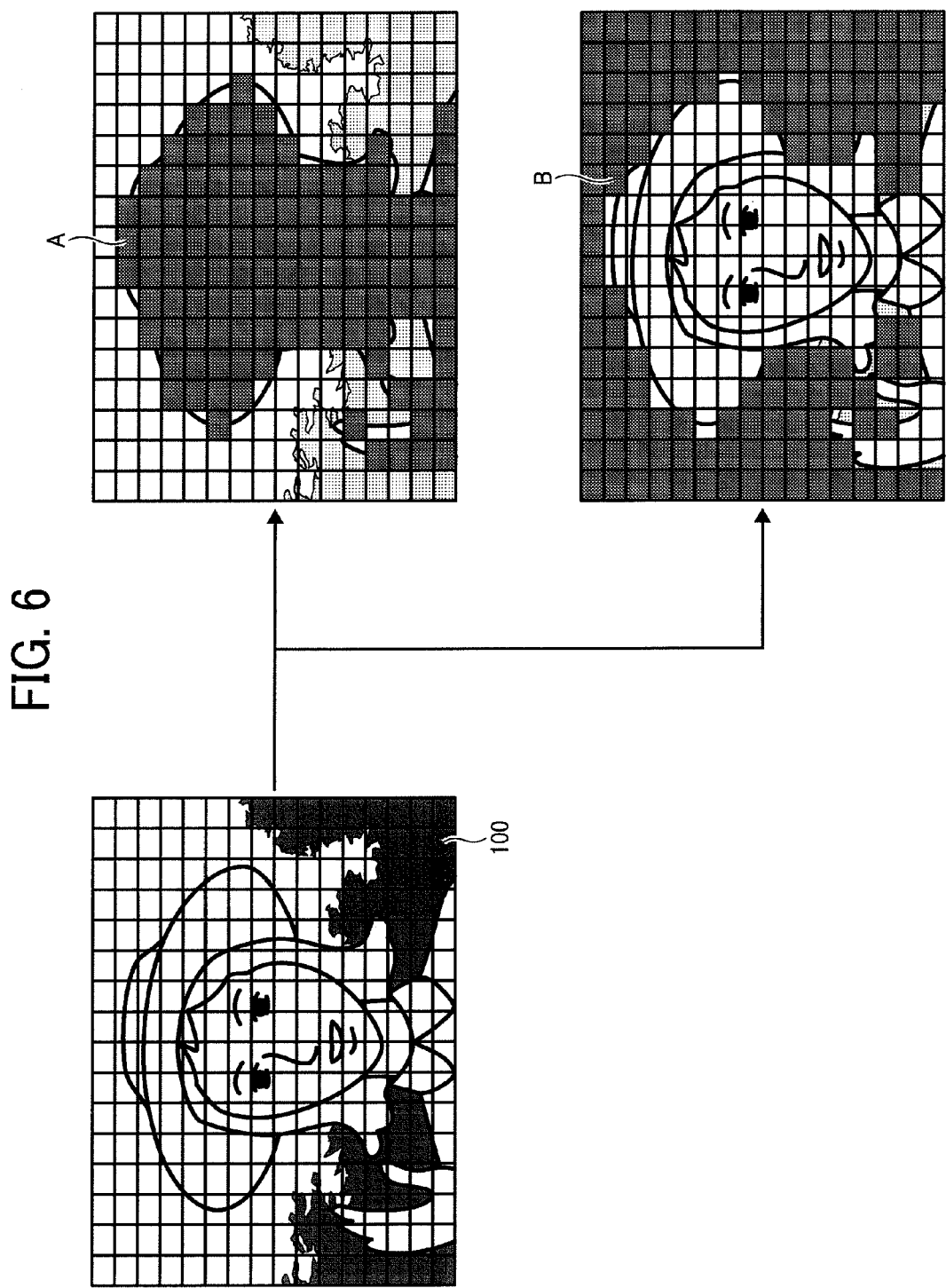
FIG. 6 shows an image captured with the imaging device according to the embodiment and divided into blocks to show a subject area and a background area.

FIG. 6 shows an example of a captured image divided into blocks, and a subject area A is an in-focus block and a background area B is a non-focus block. In this example, when a target block is given a different result in the sunny/shadow area determination from that of two vertically or horizontally adjacent blocks, the result of the target block is changed to that of the adjacent two blocks based on the in-focus information. For example, with the target block and the two vertical or horizontal adjacent blocks being all the in-focus blocks, the result of the target block in the sunny/shadow area determination is changed to that of the two adjacent blocks.

Figure 7:
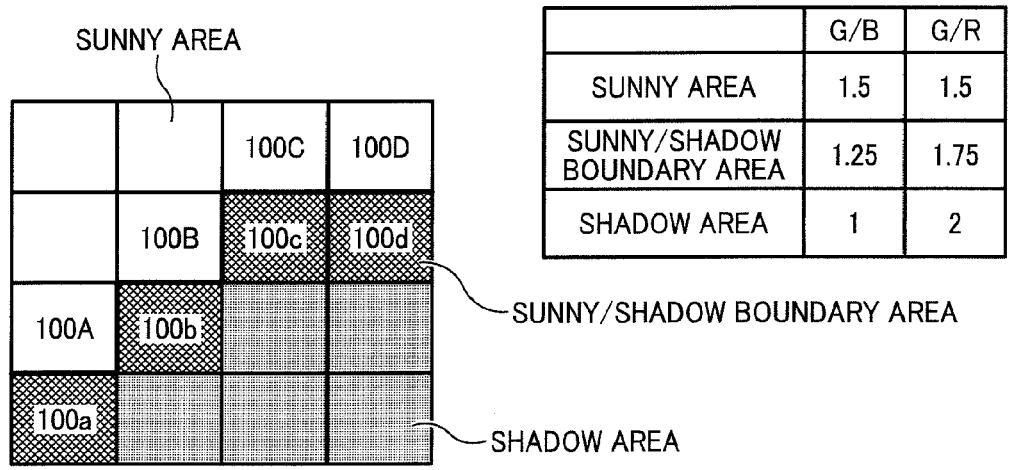
FIG. 7 shows sunny/shadow boundary blocks in 4×4 divided blocks.

After the sunny/shadow area classification, in step S5 divided blocks belonging to the shadow area in the boundary of the sunny area and the shadow area are set to sunny/shadow boundary blocks. FIG. 7 shows an example thereof using a part of a captured image, 16 (4×4) blocks. In the drawing shaded blocks belong to a shadow area, white blocks belong to a sunny area, and the boundary between the sunny and shadow areas is indicated by a bold line. Divided blocks 100*a* to 100*d* adjacent to the boundary are set to sunny/shadow boundary blocks.

Figure 8:
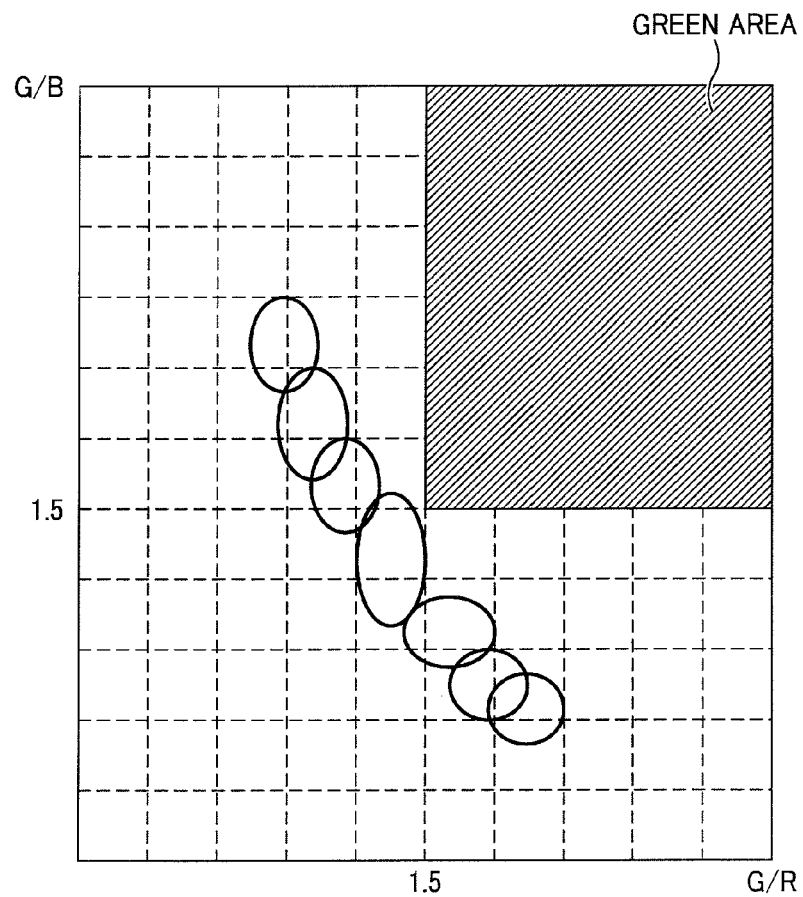
FIG. 8 shows a green area in G/R-G/B coordinates.

Proceeding to step S6, a green area is determined in each divided block 100 based on the ratios, G/R and G/B. FIG. 8 shows a relation between G/R and G/B in a green area. An area including more G component than R component and B component is determined as a green area. In the present embodiment the green area is one with G/R≧1.5 and G/B≧1.5 as shown in FIG. 8. Specifically, the ratios G/R and G/B are calculated from the RGB integration values and blocks satisfying G/R≧1.5 and G/B≧1.5 are determined as a green area. Note that the present invention is not limited to such a green area determination. Alternatively, it can be determined from color information and brightness information based on the RGB integration values. For example, the RGB integration values can be transformed into an HLS color space to determine the green area from hue and color saturation. The HLS color space refers to a space having attributes as hue, light (brightness), and saturation.

Figure 9:
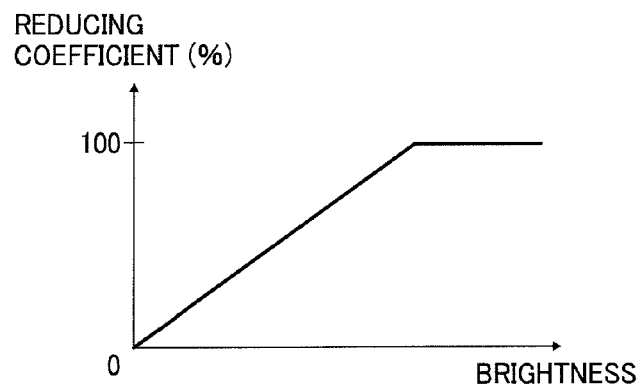
FIG. 9 is a graph showing a relation between a brightness value Y and a white balance reducing coefficient for a shadow area.

In step S7 a WB correction reducing coefficient for a shadow area is calculated based on brightness information. FIG. 9 is a graph showing a relation between the brightness value Y and the shadow area WB correction reducing coefficient. As shown in the graph, the higher the brightness value Y, the larger the WB correction reducing coefficient to set. For example, at brightness value being 0, WB correction is performed on the area at 100% (shadow area WB reducing coefficient being 0) while at brightness value being a predetermined threshold or more, WB correction is not performed on the area (shadow area WB reducing coefficient being 100%). At brightness value between 0 and the threshold, the WB reducing coefficient is set to be a function linearly interposing two points on the graph.

For example, in shooting a scene such as a wet ground (blackish color) illuminated with sunlight under a sunny sky after a rain, a wet ground portion of a captured image shows a relatively high brightness, however, it may be erroneously determined to be a shadow area. WB correction to the area with a relatively high brightness but determined as a shadow area may unnecessarily color the image of the area. In order to prevent this, the higher the brightness of the image, the higher the WB correction reducing coefficient to set, thereby performing an appropriate WB correction. It is possible to prevent a little dark sunny area from being determined as a shadow area and subjected to a WB correction for the shadow area, resulting in a slightly colored image.

Figure 10:
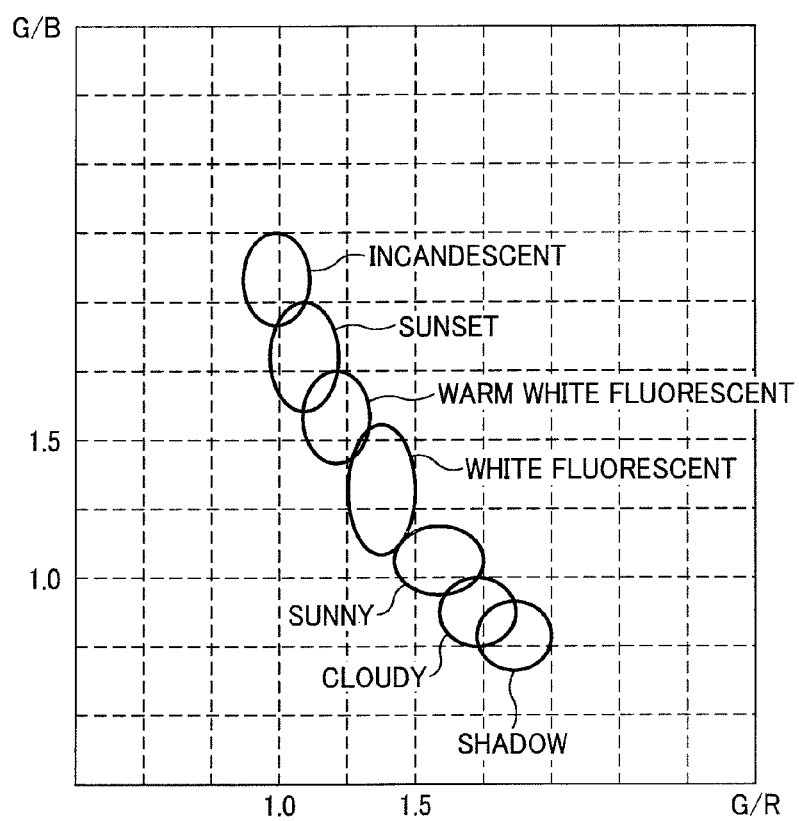
FIG. 10 is a graph showing extracted white areas in G/R-G/B coordinates.

In step S8 WB correction coefficients for representing a white portion of a captured image in white are calculated for each divided block 100. First, white extraction is performed from each divided block of the sunny area and the shadow area. The white extraction is done by calculating G/R and G/B of each divided block 100 from the RGB integration values of the sunny area and shadow area of each divided block and storing, as extracted white blocks, divided blocks included in white extraction areas which are represented with black body radiation curves in chromatic coordinates of G/R (x axis) and G/B (y axis) as shown in FIG. 10. The white extraction range is preset for each area as a subject of extraction. In the present embodiment different white extraction ranges are set for the sunny area and the shadow area. The ones on the G/R and G/B axes shown in FIG. 10 are merely an example and vary depending on the structure of the CCD 20 or else. Further, the black body radiation curves can be rectangular, for example.

Figure 11:
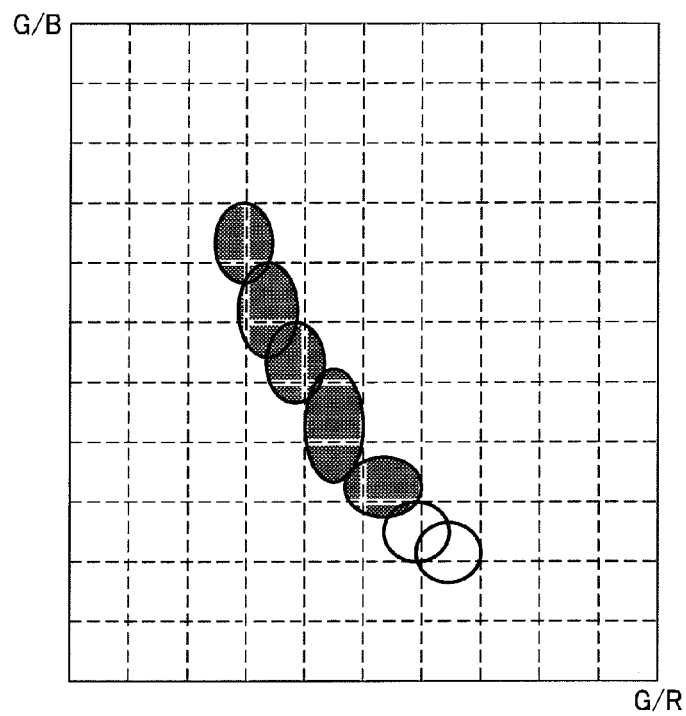
FIG. 11 is a graph showing extracted white areas in a sunny area of FIG. 10.
Figure 12:
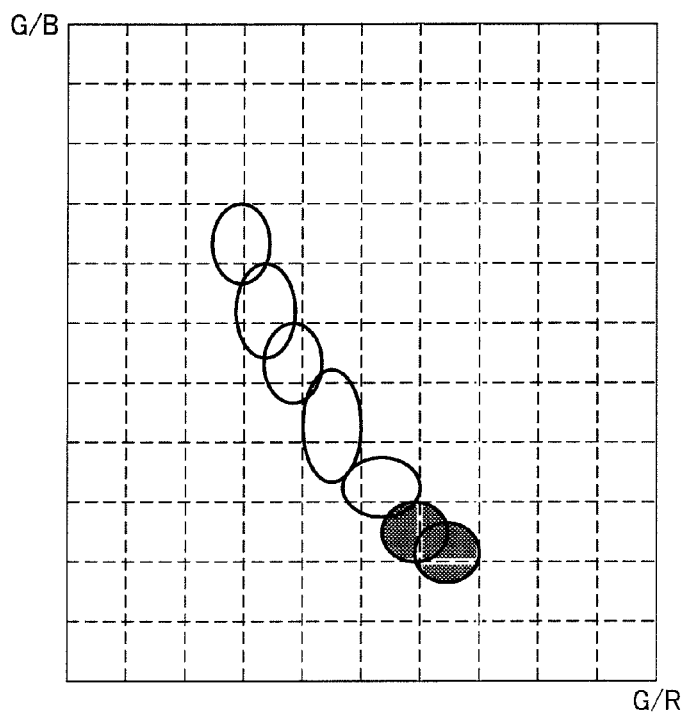
FIG. 12 is a graph showing extracted white areas in a shadow area of FIG. 10.

FIG. 11 and FIG. 12 show examples of the preset white extraction range. A shaded area in FIG. 11 is the white extraction range of the sunny area (for high brightness area) from about 2,300 to 5,800 K (Kelvin) while that in FIG. 12 is the white extraction range of the shadow area (for low brightness area) from about 5,800 to 8,000 K.

Next, with the number of extracted white blocks in each of the sunny area and the shadow area being a predetermined number or more, G/R, G/B and mean brightness value of the extracted white blocks are weighted to calculate mean G/R and mean G/B. In the present embodiment, preferably, WB correction is performed preferentially to an area showing a higher mean brightness value and an area with a high mean brightness relative to G/R and G/B are preferentially corrected. For example, G/R and G/B of a divided block with a brightness of a predetermined threshold α or more are doubled while that of a divided block with a brightness of a predetermined threshold β or more is multiplied by 1.5 (α>β). Then, the calculated mean G/R and G/B are adjusted to be within the black body radiation curve shown in FIG. 10 and set as the WB correction coefficients.

Moreover, with the number of extracted white blocks in either the sunny area or the shadow area being less than a predetermined number, the mean G/R and G/B are calculated in all the target blocks in the area, to obtain WB correction coefficients by adjusting the calculated mean values to be within the black body radiation curve. Without any extracted white blocks in either of the sunny area and the shadow area, the mean G/R and G/B are calculated in the entire image and set to be WB correction coefficients.

Further, when step S2 determines the image as a cloudy scene, the WB correction coefficients for divided blocks in the sunny area are set to be closer to the WB correction coefficients for divided blocks in the shadow area. Specifically, G/R is gradually increased by 0.2 at a time while G/B is gradually decreased by 0.2 at a time. Thus, by reducing a difference in WB correction coefficients for the sunny area and the shadow area, appropriate WB correction can be realized even for an image captured in a cloudy condition.

In step S9, a level of thus-calculated shadow area WE correction coefficients is adjusted by weighted-averaging the set WB correction coefficients for the sunny area and the shadow area in accordance with the brightness Lv of a subject in S8. For example, in FIG. 13 at brightness Lv=8, a level of the WB correction coefficients for the shadow area is adjusted to 0% while that for the sunny area is adjusted to 100%. At brightness Lv=14, a level of the WB correction coefficients for the shadow area is adjusted to 100% while that for the sunny area is adjusted to 0%.

Thus, for capturing a subject in a room a little darker than outside, for example, adjusting the level of the shadow area WB correction coefficients in accordance with the brightness Lv of the subject makes it possible to generate an image with natural white balance, even with performing WB correction separately on the sunny area and shadow area. For another example, for capturing a subject while the sun is going down or capturing a scene which cannot be distinctively determined as sunny or shadow, an image with natural white balance can be obtained by adjusting the WB correction coefficients for the sunny and shadow areas so that a difference therebetween is reduced as the brightness is decreased.

Moreover, there will be a large difference in the WB correction coefficients for the sunny and shadow areas in case of capturing a scene with a large brightness Lv which includes distinctive sunny and shadow areas, for example. In such a case, the WB correction coefficients for the two areas are adjusted so that a difference therebetween is to be within a certain range. For example, the WB correction coefficients for the shadow area are adjusted to approach those for the sunny area so that a difference in both G/R and G/B for the two areas is to be within 10%. Specifically, the shadow area WB correction coefficients are moved to such a point on the black body radiation curve in FIG. 10 as to be different by 10% or less from G/R and G/B for the sunny area. By way of example, at the WE correction coefficients for the sunny area, G/R=1.5, G/B=1, the WE correction coefficients for the shadow area are set to G/R=1.65, G/B=0.9.

As described above, it is preferable that the level adjustment of the WE correction coefficients is done in accordance with brightness Lv of a subject so that the WB correction coefficients for the shadow area get closer to those for the sunny area.

Then, in step S10 the WB correction coefficients are set to each pixel using the calculated WB correction coefficients for the sunny area and the shadow area. First, the sunny area WE correction coefficients are set for blocks of the sunny area without a change. However, for the blocks determined as the sunny area as well as a green area in step S6, the sunny area WE correction coefficients are set without a change, and for blocks determined as the shadow area and the green area, new WB correction coefficients are set by weighted-averaging 70% of the sunny area WB correction coefficients and 30% of the shadow area WB correction coefficients. This makes it possible to properly correct the green color of an image to which human eyes are sensitive, and prevent users from feeling unfamiliarity with the image.

Meanwhile, for blocks determined as the shadow area, the shadow area WB correction coefficients adjusted in step S9 are set. However, blocks determined as sunny/shadow boundary blocks in step S5 are given coefficients obtained by weighted-averaging the WE correction coefficients for the sunny area and the shadow area in the following manner.

According to the present embodiment, the WB correction coefficients for the sunny/shadow boundary blocks are determined by weighted-averaging the sunny area WB correction coefficients and the shadow area WB correction coefficients whose level is adjusted in step S9. Weighted-averaging of the coefficients is described with reference to FIG. 14 which shows an example of WB correction coefficients for straight lines of a captured image. In the drawing, widths of vertical lines with equal interval each indicate a single divided block 100 and circular marks each represent WB correction coefficients for each divided block. In general, the shadow area of an image is low in signal amounts (RGB) while the sunny area is high in signal amounts. Therefore, it is probable that adjusting the sunny area WB correction coefficients results in a large error due to a high signal amount. Because of this, in the present embodiment the shadow area WB correction coefficients are adjusted, achieving natural white balance.

The sunny area WB correction coefficients are set for blocks in the sunny area before weighted-averaging. The shadow area WB correction coefficients whose level is adjusted are set for blocks in the shadow area as well as for the sunny/shadow boundary blocks 100a to 100d in FIG. 7.

WB correction coefficients for the sunny/shadow boundary blocks 100a to 100d are acquired by weighted-averaging those for the sunny/shadow boundary blocks 100a to 100d and those for their adjacent blocks in the sunny area. In the present embodiment the ratio of weighted-averaging is 50% for the sunny area WB correction coefficients and 50% for the shadow area WB correction coefficients after level adjusting. Accordingly, white balance of the shadow area with less signal amounts is corrected, reducing a difference in white balance between the sunny area and the shadow area without color shifts, and preventing the boundary blocks from being colored. An example of calculated G/B, G/R of the sunny area, shadow area, sunny/shadow boundary block is shown in FIG. 7.

Figure 15:
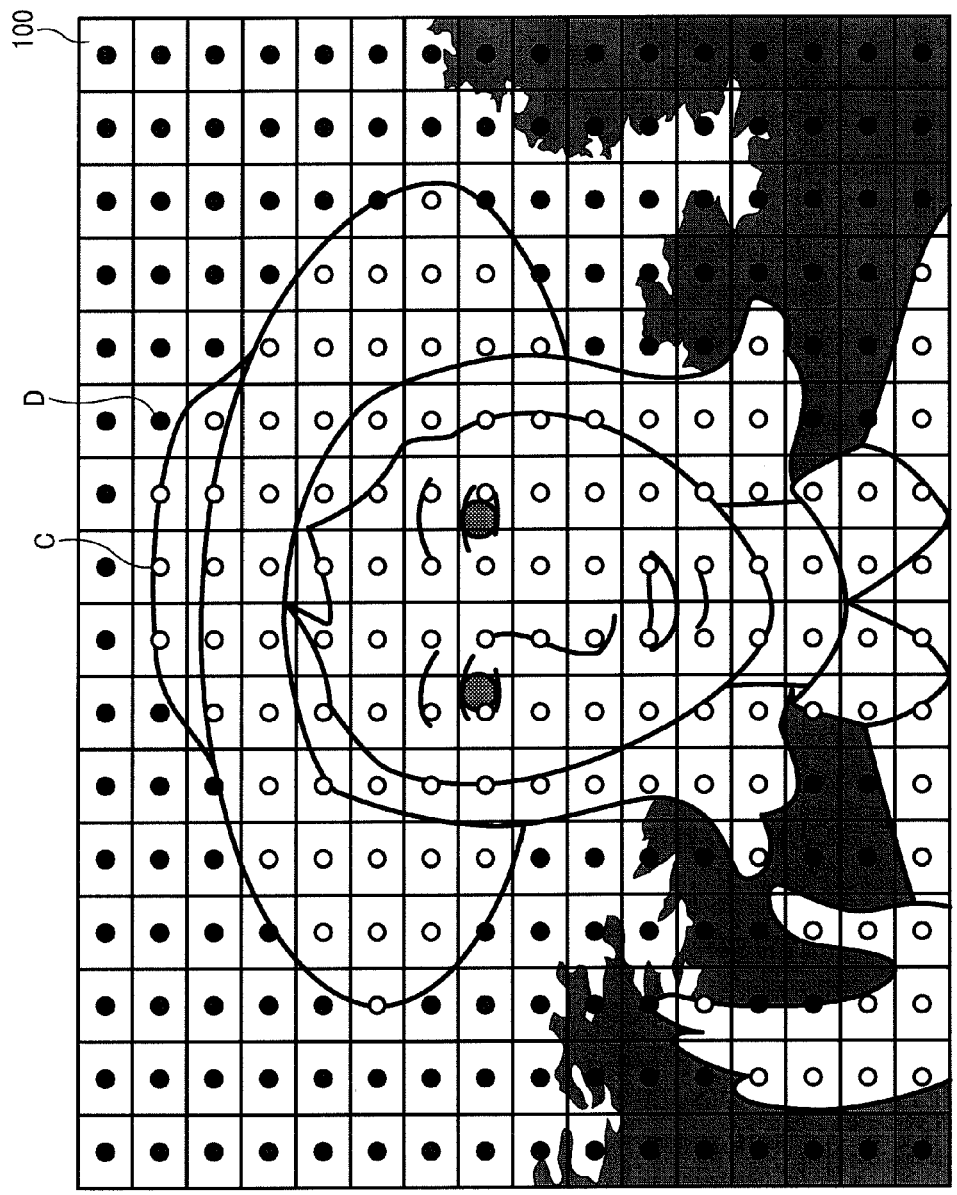
FIG. 15 shows central pixels in subject area blocks and background area blocks of the image in FIG. 6.

Next, WB correction coefficients are set to each pixel. As shown in FIG. 15, a center of each divided block 100 is to be a target pixel, and the calculated WB correction coefficients R gain, B gain for the sunny area and the shadow area are set for the target pixels, respectively. The coefficients R gain, B gain for the sunny area are set to a target pixel G in FIG. 15 and those for the shadow area are set to a target pixel D in FIG. 15.

The coefficients R gain, B gain for a non-target pixel are obtained by interpolation based on WB correction coefficients for a target pixel in the same block and those for adjacent target pixels and a distance from the non-target pixel to the target pixel and the adjacent target pixels.

Figure 16:
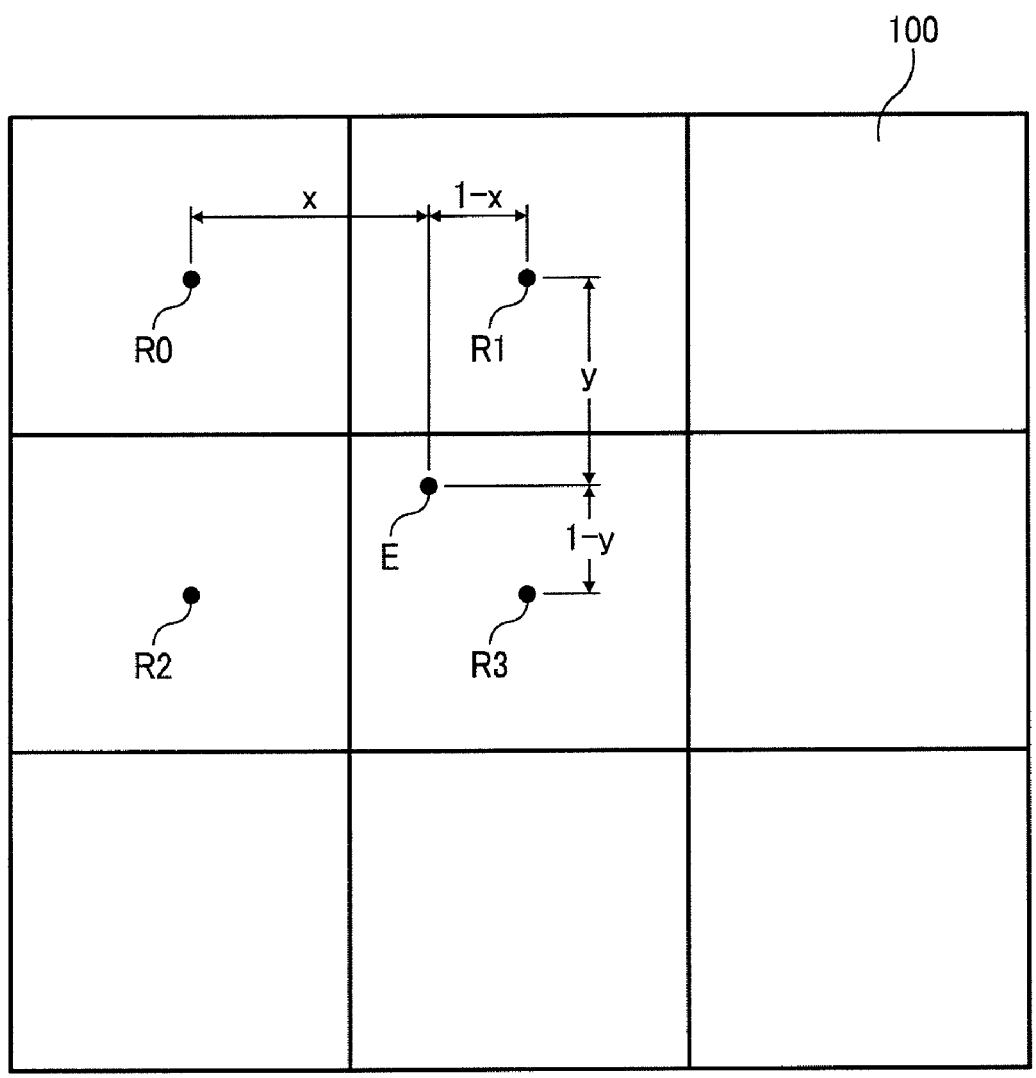
FIG. 16 shows how to calculate the white balance correction coefficients by interpolation.

With reference to FIG. 16, the calculation of the WB correction coefficients for a non-target pixel is described. To calculate a WB correction coefficient R gain (B gain) for a non-target pixel E, adjacent target pixels R0 (B0), R1 (B1), R2 (B2), R3 (B3) are assumed. The position of R3 (B3) is normalized by 1. The coefficients are calculated by the following expressions:

$$R\ gain = (1-x)(1-y)R0 + x(1-y)R1 + (1-x)yR2 + xyR3$$

$$B\ gain = (1-x)(1-y)B0 + x(1-y)B1 + (1-x)yB2 + xyB3$$

where x, y indicate positions of the non-target pixel.

Specifically, where R0=1.5, R1=1.2, R2=1.2, R3=1.2, x=0.7, y=0.6, the value of R gain for the non-target pixel will be as follows.

$$R\ gain = \{(1-0.7)\times(1-0.6)\times 1.5\} + \{0.7\times(1-0.6)\times 1.2\} + \{(1-0.7)\times 0.6\times 1.2\} + \{0.7\times 0.6\times 1.2\} = 1.236$$

Figure 17:
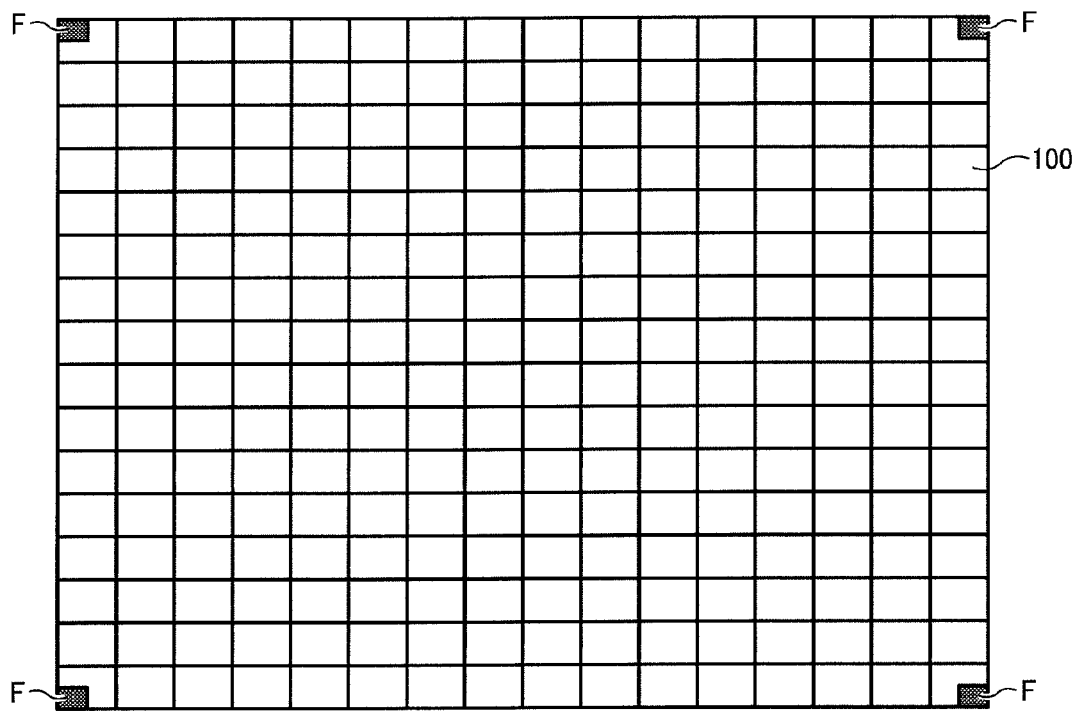
FIG. 17 shows areas F of the image of FIG. 6.

When there is only one adjacent target pixel around a non-target pixel such as pixels F shown in FIG. 17, the WB correction coefficients for the block in question is set.

Figure 18:
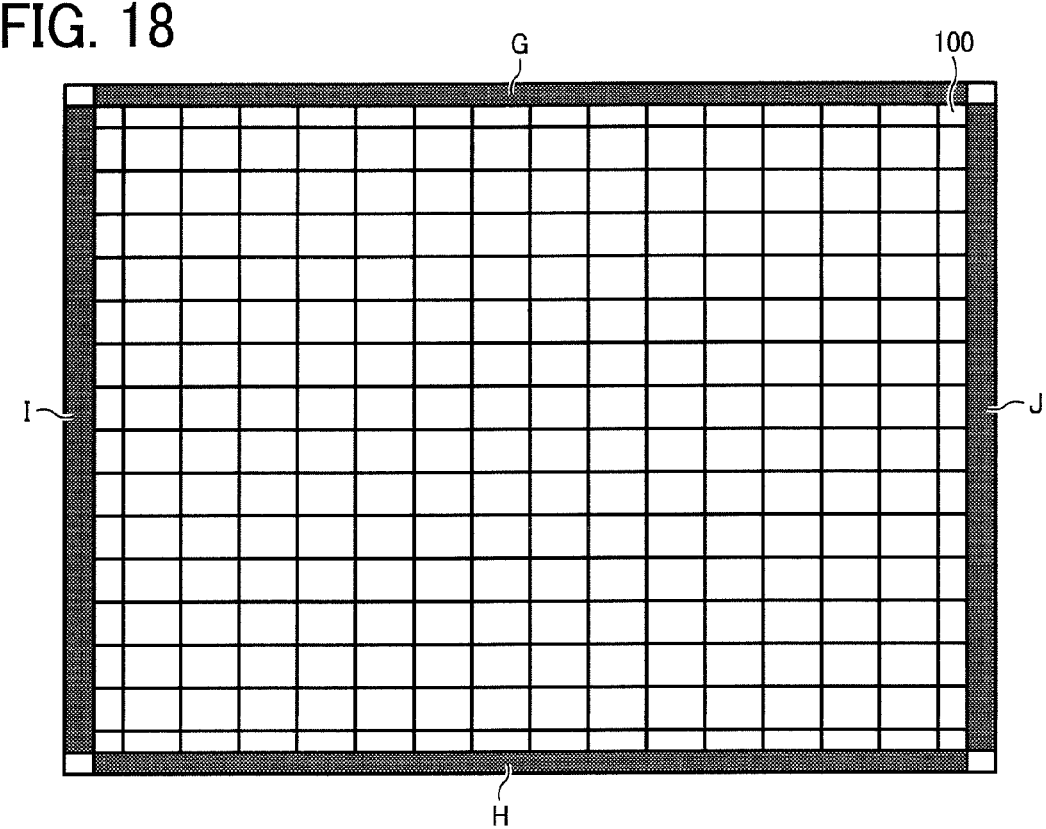
FIG. 18 shows areas G to J of the image of FIG. 6.

FIG. 18 shows non-target pixels G, H, I, J with only two adjacent target pixels. In this case, R gain and B gain therefor are calculated by interpolation from two WB correction coefficients and a distance from the non-target pixels to the target pixels in question. Calculation formulas are as follows.

For the pixels G $$R\ gain = (1-x)R2 + xR3$$

$$B\ gain = (1-x)B2 + xB3$$

For the pixels H $$R\ gain = (1-x)R0 + xR1$$

$$B\ gain = (1-x)B0 + xB1$$

For the pixels I $$R\ gain = (1-y)R1 + yR3$$

$$B\ gain = (1-y)B1 + yB3$$

For the pixels J $$R\text{ gain}=(1-y)R0+yR2$$

$$B\text{ gain}=(1-y)B0+yB2$$

Then, R data and B data of the RAW-RGB data for each pixel stored in the SDRAM 23 are multiplied by the calculated WB correction coefficients R gain, B gain.

Note that in the above, the WB correction coefficients for the non-target pixels are calculated in a part of a captured image, the sunny area and the shadow area, by way of example. However, the present invention is not limited thereto. The coefficients are also calculated for divided blocks 100 as a green area and divided blocks 100 as sunny/shadow boundary area.

A storage medium according to the present invention is configured to store a program which allows a computer provided in a device having an image processing function to execute an imaging operation in the above embodiment. A type of a storage medium or computer language of a program can be arbitrarily decided from any known media or languages.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging device comprising:
an optical system which captures an optical image of a subject;
an image sensor which converts the optical image into an electric signal and outputs the electric signal as an image signal; an image generator which generates an image of the subject based on the imaging signal;
a dividing unit which divides the generated image into n blocks, the n being an integer of 4 or more;
a white balance evaluation value acquiring unit which acquires color information from the image signal and acquires a white balance evaluation value of each of the n blocks from the color information for a white balance control;
a classifying unit which combines-the n blocks into m areas based on the color information, the m being an integer satisfying a relation n>m≧2;
a correction coefficient calculating unit which calculates a white balance correction coefficient for each of the m areas based on white balance evaluation values of the blocks in each of the m areas;
a white balance setting unit which sets the calculated white balance correction coefficient for each of the m areas;
and a green area determining unit which determines whether or not each of the n blocks is a green area based on the color information,
wherein when there is a block among the n blocks determined as a green area by the green area determining unit, the white balance setting unit sets a different white balance correction coefficient for the block from one set for an area including the block; and wherein the imaging device further comprising
a white extraction unit which extracts a white portion from the generated image, wherein: the classifying unit classifies the generated image into a high brightness area and a low brightness area based on the color information and brightness information of the image signal;
the white extraction unit extracts the white portion from each of the high and low brightness areas based on different extraction ranges of whiteness for the high and low brightness areas;
the correction coefficient calculating unit calculates the white balance correction coefficient for each of the m areas based on a result of the white extraction from the white extraction unit and the white balance evaluation value of each of the m areas;
and for the block determined as the green area by the green area determining unit, the white balance setting unit sets the white balance correction coefficient for the high brightness area when the block is in the high brightness area and when the block is in the low brightness area, sets the white balance correction coefficient obtained by weighted-averaging the white balance correction coefficient for the high brightness area and the white balance correction coefficient for the low brightness area.

2. An imaging device according to claim 1, wherein the white extraction unit extracts the white portion from the high brightness area based on the white balance evaluation value of the high brightness area and an extraction range of whiteness for the high brightness area and extracts the white portion from the low brightness area based on the white balance evaluation value of the low brightness area and an extraction range of whiteness for the low brightness area.

3. An imaging device according to claim 1, wherein: the blocks each include a target pixel and a non-target pixel; the white balance setting unit comprises a first correction coefficient portion which acquires the white balance correction coefficient for the target pixel in each of the blocks, and a second correction coefficient portion which acquires, for the non-target pixel in each of the blocks, the white balance correction coefficient by interpolation of the white balance correction coefficient for an adjacent target pixel and a distance from the non-target pixel in question to the adjacent target pixel; the white balance setting unit sets the white balance correction coefficients acquired by the first and second coefficient portions for the respective pixels.

4. An imaging device according to claim 3, wherein the target pixel is a pixel located at a center of each block.

5. An imaging method comprising the steps of: capturing an optical image of a subject;
converting the optical image into an electric signal and outputting the electric signal as an image signal;
generating an image of the subject based on the image signal;
dividing the generated image into n blocks, the n being an integer of 4 or more; acquiring color information from the image signal and acquiring a white balance evaluation value of each of the n blocks from the color information for a white balance control;
and combining the n blocks into m areas based on the color information, the m being an integer satisfying a relation n>m≧2;
calculating a white balance correction coefficient for each of the m areas based on white balance evaluation values of the blocks in each of the m areas;
setting the calculated white balance correction coefficient for each of the m areas; and determining whether or not each of the n blocks is a green area based on the color information,
wherein in the coefficient setting step, when there is a block among the n blocks determined as the green area in the green area determining step, a different white balance correction coefficient is set for the block from one set for an area including the block;

and wherein the imaging method further comprises the steps of:

classifying the generated image into a high brightness area and a low brightness area based on the color information and brightness information of the image signal; extracting a white portion from each of the high and low brightness areas based on different extraction ranges of whiteness for the high and low brightness areas;

and calculating the white balance correction coefficient for each of the m areas based on a result of the white extraction from the white extraction unit and the white balance evaluation value of each of the m areas, wherein the coefficient setting step includes setting, for the block determined as the green area in the green area determining step, the white balance correction coefficient for the high brightness area when the block is in the high brightness area, and when the block is in the low brightness area, setting the white balance correction coefficient obtained by weighted-averaging the white balance correction coefficient for the high brightness area and the white balance correction coefficient for the low brightness area.

6. An imaging method according to claim 5, wherein the white portion extracting step includes extracting the white portion from the high brightness area based on the white balance evaluation value of the high brightness area and an extraction range of whiteness for the high brightness area and extracting the white portion from the low brightness area based on the white balance evaluation value of the low brightness area and an extraction range of whiteness for the low brightness area.

7. An imaging method according to claim 5, wherein: the blocks each include a target pixel and a non-target pixel; the white balance setting step includes acquiring a first white balance correction coefficient for the target pixel in each of the blocks, and acquiring, for the non-target pixel in each of the blocks, a second white balance correction coefficient by interpolation of the white balance correction coefficient for an adjacent target pixel and a distance from the non-target pixel in question to the adjacent target pixel, and setting the white balance correction coefficients acquired by the first and second coefficient portions for the respective pixels.

8. An imaging method according to claim 7, wherein the target pixel is a pixel located at a center of each block.

9. A non-transitory computer readable storage medium in which a program is stored, the program allowing a computer to execute the steps of: capturing an optical image of a subject and converting the optical image into an electric signal and outputting the electric signal as an image signal;

generating an image of the subject based on the image signal;

dividing the generated image into n blocks, the n being an integer of 4 or more; acquiring color information from the image signal and acquiring a white balance evaluation value of each of the n blocks from the color information for a white balance control;

and combining the n blocks into m areas based on the color information, the m being an integer satisfying a relation $n > m \geq 2$;

calculating a white balance correction coefficient for each of the m areas based on white balance evaluation values of the blocks in each of the m areas;

setting the calculated white balance correction coefficient for each of the m areas; and determining whether or not each of the n blocks is a green area based on the color information, wherein the coefficient setting step includes setting, when there is a block among the n blocks determined as the green area in the green area determining step, a different white balance correction coefficient for the block from one set for an area including the block;

and wherein the program allows the computer to further execute the steps of: classifying the generated image into a high brightness area and a low brightness area based on the color information and brightness information of the image signal;

extracting a white portion from each of the high and low brightness areas based on different extraction ranges of whiteness for the high and low brightness areas;

and calculating the white balance correction coefficient for each of the m areas based on a result of the white extraction from the white extraction unit and the white balance evaluation value of each of the m areas, wherein the coefficient setting step includes setting, for the block determined as the green area in the green area determining step, the white balance correction coefficient for the high brightness area when the block is in the high brightness area, and when the block is in the low brightness area, setting the white balance correction coefficient obtained by weighted-averaging the white balance correction coefficient for the high brightness area and the white balance correction coefficient for the low brightness area.

10. A computer readable storage medium according to claim 9, wherein the white portion extracting step includes extracting the white portion from the high brightness area based on the white balance evaluation value of the high brightness area and an extraction range of whiteness for the high brightness area and extracting the white portion from the low brightness area based on the white balance evaluation value of the low brightness area and an extraction range of whiteness for the low brightness area.

11. A computer readable storage medium according to claim 9, wherein: the blocks each include a target pixel and a non-target pixel; the white balance setting step includes acquiring a first white balance correction coefficient for the target pixel in each of the blocks, and acquiring, for the non-target pixel in each of the blocks, a second white balance correction coefficient by interpolation of the white balance correction coefficient for an adjacent target pixel and a distance from the non-target pixel in question to the adjacent target pixel, and setting the white balance correction coefficients acquired by the first and second coefficient portions for the respective pixels.

12. A computer readable storage medium according to claim 11, wherein the target pixel is a pixel located at a center of each block.

* * * * *